UNITED STATES PATENT OFFICE.

WILLIAM E. B. DAVIES, OF ALLEGHENY, PENNSYLVANIA.

VARNISH.

SPECIFICATION forming part of Letters Patent No. 320,464, dated June 23, 1885.

Application filed June 6, 1884. (Specimens.)

*To all whom it may concern:*

Be it known that I, WILLIAM E. B. DAVIES, a citizen of the United States, residing at Allegheny, in the county of Allegheny and State of Pennsylvania, have invented a new and useful composition to be used as a transparent quick-drying varnish, and which may also be used in the mixture of paints, of which the following is a specification.

My composition consists of the following ingredients, combined in the proportions stated: rosin, three hundred pounds; crude turpentine, seventy-five pounds; naphtha, twenty gallons; black oxide of manganese, one pound; oxide of lead or litharge, one pound; umber, (either raw or burnt,) two pounds; essence of bergamot, two ounces; linseed-oil, two gallons.

To prepare my rapidly-drying transparent varnish, the rosin, crude turpentine, manganese, oxide of lead, umber, essence of bergamot, and linseed-oil are placed in a vessel and brought to the required heat or until the ingredients are thoroughly mixed. After cooling, the naphtha is added and the whole agitated, when the varnish is ready for use.

I claim—

A compound or varnish consisting of rosin, crude turpentine, naphtha, black oxide of manganese, oxide of lead, umber, essence of bergamot, and linseed-oil, combined in about the proportions named.

WILLIAM E. B. DAVIES.

Witnesses:
H. T. MORRIS,
J. B. POOR.